(12) United States Patent
Anderson et al.

(10) Patent No.: US 10,713,907 B2
(45) Date of Patent: Jul. 14, 2020

(54) HAPTIC DEVICE FOR MIXED REALITY ENVIRONMENTS

(71) Applicant: AUTODESK, INC., San Rafael, CA (US)

(72) Inventors: Fraser Anderson, Camrose (CA); Tovi Grossman, Toronto (CA); Teng Han, Winnipeg (CA); Pourang Polad Irani, Winnipeg (CA)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 16/118,345

(22) Filed: Aug. 30, 2018

(65) Prior Publication Data

US 2020/0035071 A1  Jan. 30, 2020

Related U.S. Application Data

(60) Provisional application No. 62/711,435, filed on Jul. 27, 2018.

(51) Int. Cl.
| G08B 6/00 | (2006.01) |
| G06F 3/01 | (2006.01) |

(Continued)

(52) U.S. Cl.
CPC .............. G08B 6/00 (2013.01); F15B 11/10 (2013.01); F15B 15/10 (2013.01); G06F 3/014 (2013.01);

(Continued)

(58) Field of Classification Search
CPC . G08B 6/00; F15B 11/10; F15B 15/10; F15B 2211/20576; F15B 2211/255;

(Continued)

(56) References Cited

U.S. PATENT DOCUMENTS

| 10,013,062 B1* | 7/2018 | Corson | G06F 3/016 |
| 2009/0096746 A1* | 4/2009 | Kruse | G06F 3/014 |
| | | | 345/156 |

(Continued)

OTHER PUBLICATIONS

Whitesides, George M., "The origins and the future of microfluidics", Nature, vol. 442, Jul. 27, 2006, pp. 368-373.

(Continued)

*Primary Examiner* — Joseph H Feild
*Assistant Examiner* — Rufus C Point
(74) *Attorney, Agent, or Firm* — Artegis Law Group, LLP (57) ABSTRACT

A haptic system includes a haptic ring that is worn on the finger of a user. The haptic ring includes a flexible tube that is positioned against the finger pad of the user and configured to transport a fluid across the finger pad of the user. A first pump is configured to pump a warm fluid into the flexible tube and a second pump is configured to pump a cold fluid into the flexible tube, thereby providing a haptic sensation of temperature. A valve is positioned downstream of the haptic ring that is configured to open and close to modulate the pressure of the fluid, thereby providing a haptic sensation of pressure and/or vibration to the finger pad of the user. The haptic ring is unobtrusive and therefore does not significantly interfere with the ability of the user to perceive tactile sensations of the real world.

20 Claims, 5 Drawing Sheets

(51) Int. Cl.
  F15B 11/10   (2006.01)
  F15B 15/10   (2006.01)
  A63F 13/285  (2014.01)

(52) U.S. Cl.
  CPC ... *A63F 13/285* (2014.09); *F15B 2211/20576* (2013.01); *F15B 2211/255* (2013.01); *F15B 2211/2656* (2013.01); *F15B 2211/6306* (2013.01); *F15B 2211/705* (2013.01)

(58) Field of Classification Search
  CPC ...... F15B 2211/2656; F15B 2211/6306; F15B 2211/705; G06F 3/014; A63F 13/285
  See application file for complete search history.

(56) References Cited

U.S. PATENT DOCUMENTS

| | | | |
|---|---|---|---|
| 2016/0238040 A1* | 8/2016 | Gallo | A61B 34/76 |
| 2016/0274662 A1* | 9/2016 | Rimon | G06F 3/014 |
| 2017/0168576 A1* | 6/2017 | Keller | G06F 3/014 |
| 2017/0300115 A1* | 10/2017 | Kerr | G06F 3/016 |
| 2018/0107277 A1* | 4/2018 | Keller | G06F 3/014 |
| 2018/0179051 A1* | 6/2018 | Keller | B81C 1/00119 |

OTHER PUBLICATIONS

Yao et al., "PneUI: Pneumatically Actuated Soft Composite Materials for Shape Changing Interfaces", Proceedings of the 26th annual ACM symposium on User interface software and Technology, ACM, http://dx.doi.org/10.1145/2501988.2502037, Oct. 8-11, 2013, pp. 13-22.

Drip chamber, Wikipedia, https://en.wikipedia.org/w/index.php?title=Drip_chamber&oldid=824568517, dated Feb. 8, 2018, retrieved Jan. 24, 2020, 1 page.

3D Systems, Haptic Devices: Add the sense of Touch to your digital world, https://www.3dsystems.com/haptics-devices/touch, brochure version dated Jan. 2018, 4 pages.

Ford Pilots New Exoskeleton Technology to Help Lessen Chance of Worker Fatigue, Injury, Ford Media Center, https://media.ford.com/content/fordmedia/fna/us/en/news/2017/11/09/ford-exoskeleton-technology-pilot.html, dated Nov. 9, 2017, retrieved Jan. 24, 2020, 3 pages.

Digital plug & play infrared thermometer in a TO-can, Melexis, https://www.melexis.com/en/product/mlx90614/digital-plug-play-infrared-thermometer-to-can, Apr. 8, 2018 snapshot from https://web.archive.org/web/20180408214803/https://www.melexis.com/en/product/mlx90614/digital-plug-play-infrared-thermometer-to-can, retrieved Jan. 28, 2020, 9 pages.

\* cited by examiner

HAPTIC DEVICE FOR MIXED REALITY ENVIRONMENTS

CROSS-REFERENCE TO RELATED APPLICATIONS

This application claims the priority benefit of United States provisional patent application titled, "Mixed Reality Haptics via Liquid Flow," filed on Jul. 27, 2018 and having Ser. No. 62/711,435. The subject matter of this related application is hereby incorporated herein by reference.

BACKGROUND

Field of the Various Embodiments

Embodiments of the present invention relate generally to haptic devices and, more specifically, to a haptic device for mixed reality environments.

Description of the Related Art

A haptic device worn on the hand of a user outputs physical stimuli to the user to simulate tactile sensations. For example, a haptic glove worn on the hand of a user could include mechanical actuators that output pressure to the hand to simulate the sensation of holding an object. In some applications, haptic devices are implemented to output physical stimuli to users to enhance the realism of virtual reality simulations. For example, a haptic glove could be used in conjunction with a virtual basketball game to simulate the sensation of dribbling a basketball.

Despite being applicable to virtual reality simulations, conventional haptic devices cannot be used effectively in mixed reality environments that include both simulated elements and real-world elements. In particular, conventional haptic devices are oftentimes too bulky to allow the user to perceive tactile sensations associated with the real-world elements in mixed reality environments. Further, conventional haptic devices often include complex mechanical actuators that diminish the ability of the user to interact with real-world elements in a natural manner. Consequently, conventional haptic devices can only be used to simulate sensations associated with the simulated elements in mixed reality environments, leaving the user feeling isolated from the real-world elements in those mixed reality environments.

As the foregoing illustrates, what is needed in the art is a haptic device that operates more effectively in mixed reality environments.

SUMMARY

Various embodiments include a system, including a haptic device that is worn on a finger of a user and includes a tube that transports a fluid, and a first pump that is fluidly connected to the haptic device via the tube and pumps a first portion of fluid through the tube, wherein the haptic device outputs a first physical stimulus to the finger of the user in response to the first pump pumping the first portion of fluid through the tube.

At least one advantage of the disclosed techniques is that the user can perceive both real-world tactile sensations and simulated tactile sensations while wearing the haptic ring. Accordingly, the haptic ring is especially applicable to mixed reality environments that include both real-world and simulated elements.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As noted above, conventional haptic devices are too bulky to be effectively used with mixed reality environments. In particular, a conventional haptic device interferes with the ability of a user to touch real-world objects and textures. Consequently, a user of a conventional haptic device can only perceive simulated sensations generated by the haptic device and thus becomes isolated from the real world.

To address these issues, embodiments of the invention include a haptic ring configured to be worn on the finger of a user. The haptic ring includes a flexible tube that is positioned against the finger pad of the user and configured to transport a fluid across the finger pad of the user. A first pump is configured to pump a warm fluid into the flexible tube and a second pump is configured to pump a cold fluid into the flexible tube. The warm and cold fluids mix together and travel through the flexible tube and across the finger pad of the user. The pump rates of the first and second pumps can be modulated relative to one another to cause the fluid travelling across the finger pad of the user to have a specific temperature. In this manner, the haptic ring causes the user to experience the sensation of temperature.

A valve is positioned downstream of the haptic ring that is configured to open and close to modulate the pressure of the fluid. The valve can be closed to cause pressure to accumulate within the flexible tube. In response, the flexible tube expands and exerts a force against the finger pad of the user, thereby causing the user to experience the sensation of pressure. The valve can also be opened and closed repeatedly to cause the pressure within the flexible tube to fluctuate, thereby causing the user to experience the sensation of vibration.

Temperature and pressure sensors are positioned upstream of the haptic ring and configured to measure the temperature and pressure, respectively, of the fluid flowing through the flexible tube. A controller is coupled to the temperature and pressure sensors and configured to monitor the temperature and pressure of the fluid. The controller is also coupled to the first and second pumps and to the valve. Based on temperature readings obtained from the temperature sensor, the controller transmits control signals to the first and second pumps to control the temperature that is output to the user. Based on pressure readings obtained from the pressure sensor, the controller transmits control signals to the valve to control the pressure and/or vibration output to the user. Thus, the controller maintains closed-loop control over the temperature and pressure of the fluid flowing through the flexible tube.

The controller can also detect a difference between a pressure that is expected to have accumulated within the tube and a pressure that has actually accumulated within the tube. This difference in pressure typically results when the user touches a real-world object or texture that exerts a pressure against the flexible tube. The controller is configured to analyze the pressure difference to generate a model of the real-world object or texture that is being touched based on the pressure difference. The controller can subsequently cause the haptic ring to simulate the experience of touching the real-world object or texture by modulating the pressure within the flexible tube based on the generated model.

At least one advantage of the disclosed approach is that the haptic ring has a lightweight and unobtrusive form factor that does not prevent the user from perceiving real-world objects and textures. In particular, the flexible tube is thin and therefore allows the user to perceive tactile stimuli in a natural manner. Further, the fluid can be evacuated from the tube to increase the resolution with which the user can perceive tactile stimuli. The haptic ring is also capable of delivering physical stimuli across multiple sensory modalities. For these reasons, the haptic ring is especially applicable to mixed reality environments where the user should be able to perceive simulated elements and real-world elements alike. Therefore, the disclosed approach confers a technical advancement over conventional haptic devices that cannot be effectively applied to mixed reality environments.

System Overview

Figure 1:
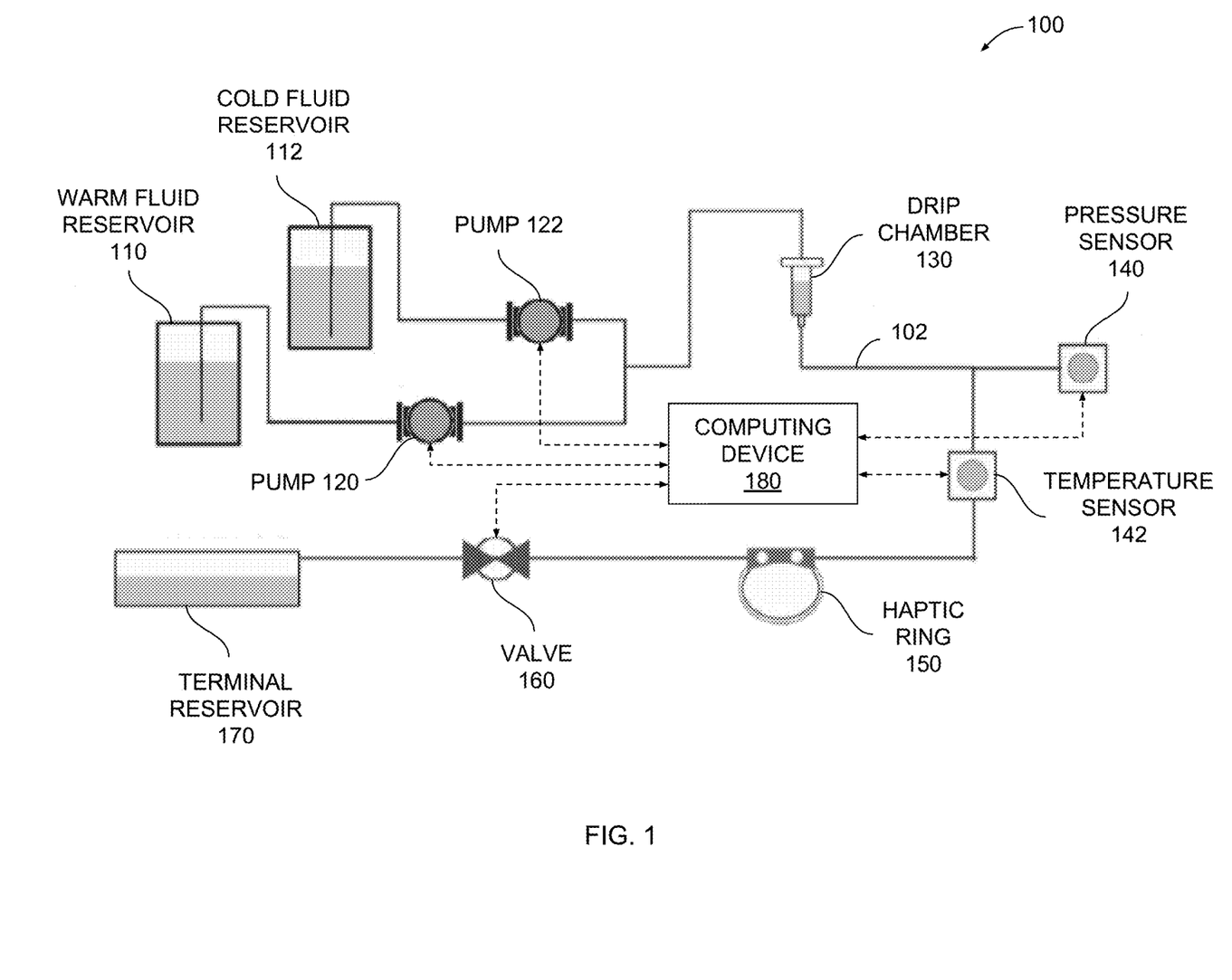
FIG. 1 illustrates a system configured to implement one or more aspects of the present invention.

FIG. 1 illustrates a system configured to implement one or more aspects of the present invention. As shown, a system 100 includes one or more tubes 102 that fluidly couple together warm fluid reservoir 110, a cold fluid reservoir 112, pumps 120 and 122, a drip chamber 130, a pressure sensor 140, a temperature sensor 142, a haptic ring 150, a valve 160, and a terminal reservoir 170. Tubes 102 can transport any technically feasible fluid between the fluidly connected elements of system 100, including liquids such as water and/or gases such as air. System 100 also includes a computing device 180 that is electrically coupled to pumps 120 and 122, pressure sensor 140, temperature sensor 142, and valve 160.

In operation, pumps 120 and 122 draw fluid from warm fluid reservoir 110 and cold fluid reservoir 112, respectively, and pump warm and cold fluid into drip chamber 130. The warm fluid and the cold fluid mix together and enter drip chamber 130 with a given temperature and pressure. Drip chamber 130 stabilizes turbulence in the fluid and prevents the formation of bubbles. The fluid exits drip chamber 130 and travels past pressure sensor 140 and temperature sensor 142. Pressure sensor 140 measures the static and/or dynamic pressure of the fluid and transmits pressure readings to computing device 180. Temperature sensor 142 measures the static and/or dynamic temperature of the fluid and transmits temperature readings to computing device 180. The fluid then travels into haptic ring 150.

Haptic ring 150 is a wearable device that is configured to be worn on the finger of a user and to output physical stimuli to the finger pad of the user. Haptic ring 150 includes a thin tube (not shown here) that is positioned against the finger pad of the user. The tube is configured to transport the fluid across the finger pad of the user. Valve 160 can be opened to allow the fluid to exit haptic ring 150 and travel to terminal reservoir 170. Valve 160 can be closed to impede the flow of the fluid and cause pressure to accumulate within tubes 102. Valve 160 can also be opened and closed repeatedly to cause pressure to fluctuate within tubes 102. Haptic ring 150 is described in greater detail below in conjunction with FIGS. 2-3.

Computing device 180 transmits control signals to pumps 120 and 122 to cause the mixing of warm and cold fluid to achieve a target temperature. Computing device 180 implements a closed-loop temperature control process based on readings gathered from temperature sensor 142. When the fluid travels through haptic ring 150 across the finger pad of the user, heat is conducted into or out of the finger pad, causing the user to experience a tactile sensation of the target temperature. Computing device 180 also transmits control signals to pumps 120 and 122 and valve 160 cause the fluid to have a target pressure. Computing device 180 implements a closed-loop pressure control process based on readings gathered from pressure sensor 140. When valve 160 is closed, the pressure of the fluid accumulates within haptic ring 150 and a section of a tube 102 expands against the finger pad of the user, causing the user to experience a tactile sensation of the target pressure. When valve 160 is opened and closed repeatedly, the pressure of the fluid fluctuates within haptic ring 150 and the aforesaid section of tube 102 expands and contracts against the finger pad of the user, causing the user to experience a vibration having a target frequency and magnitude. Computing device 180 is described in greater detail below in conjunction with FIG. 4.

Haptic Ring

Figure 2:
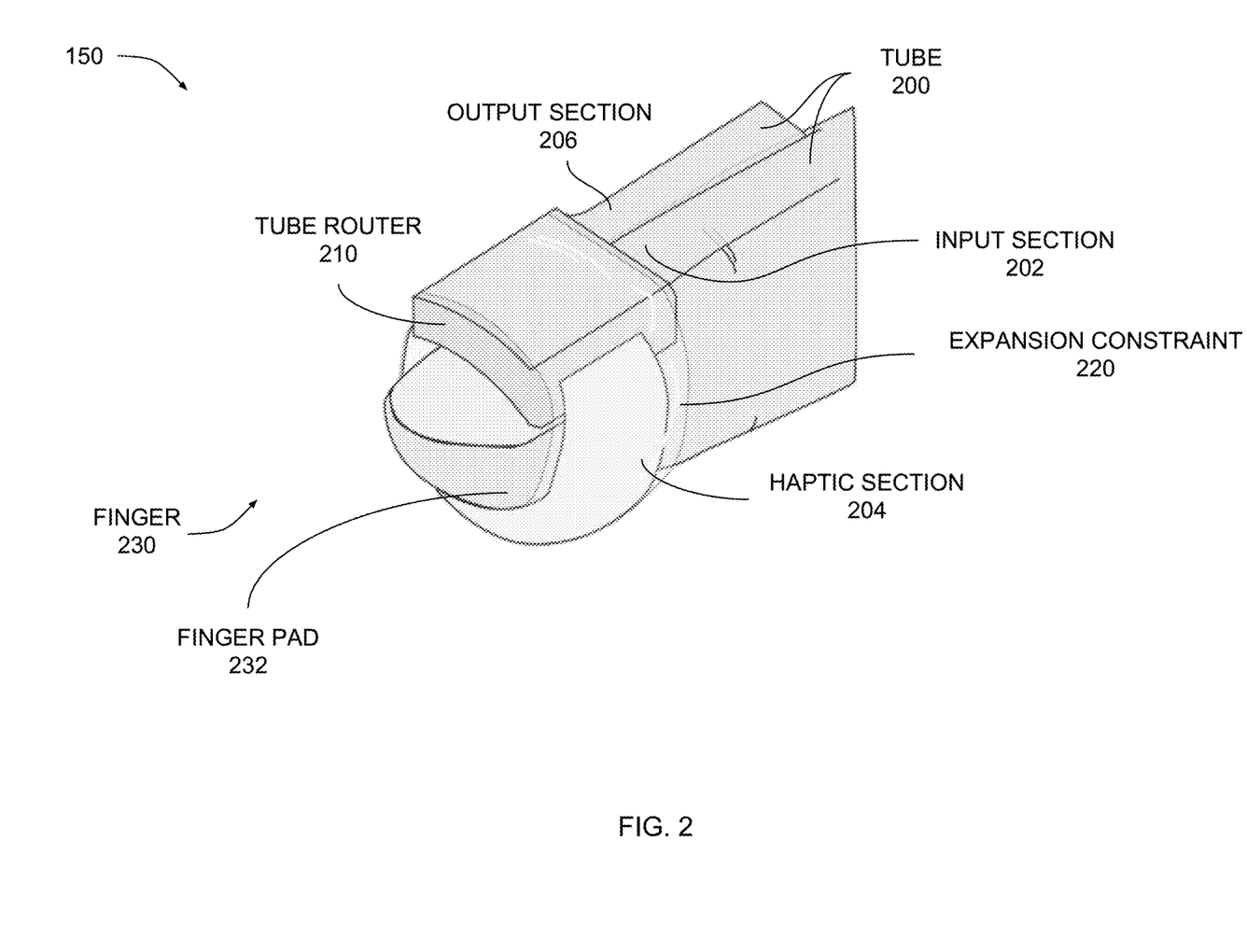
FIG. 2 is a more detailed illustration of the haptic ring of FIG. 1, according to various embodiments of the present invention.

FIG. 2 is a more detailed illustration of the haptic ring of FIG. 1, according to various embodiments of the present invention. As shown, haptic ring 150 includes a tube 200, a tube router 210, and an expansion constraint 220. Tube 200 includes an input section 202, a haptic section 204, and an output section 206. Tube 200 is included in, or coupled to, tubes 102 of FIG. 1. Haptic section 204 is generally thin, flexible, and expandable. In one embodiment, haptic section 204 is a latex tube. Various components of haptic ring 150 can be printed using a three-dimensional (3D) printer, including tube router 210

Haptic ring 150 is worn on finger 230 of a user. Input section 202 and output section 206 are positioned on the top of finger 230 parallel to one another, while haptic section 204 is positioned across finger pad 232 of finger 230. Tube router 210 generally maintains the positioning of input section 202, haptic section 204, and output section 206 of tube 200 relative to finger 230 and finger pad 232. Expansion constraint 220 is coupled to tube router 210 and haptic section 204 and configured to surround tube router 210 and haptic section 204. Expansion constraint 204 can be flexible but is not designed to stretch.

In some modes of operation, fluid enters haptic ring 150 through input section 202, travels through haptic section 204, and exits haptic ring 150 through output section 206. When the fluid travels in this manner, heat and can be conducted into or out of finger pad 232 via haptic section 204 to cause the user to experience the sensation of a particular temperature. In other modes of operation, the flow of the fluid is impeded by at least partially closing valve 160 and the fluid stagnates within haptic section 204. When the flow of fluid is impeded and pumps 120 and 122 continue to operate, pressure accumulates within tube 200. In response, haptic section 204 expands against expansion constraint 220 and towards finger pad 232, causing the user to experience the sensation of a particular pressure. Valve 160 can then be at least partially opened to release the accumulated pressure and cause the user to experience the sensation of vibration. The operation of haptic ring 150 is described in greater detail below in conjunction with FIG. 3.

Figure 3:
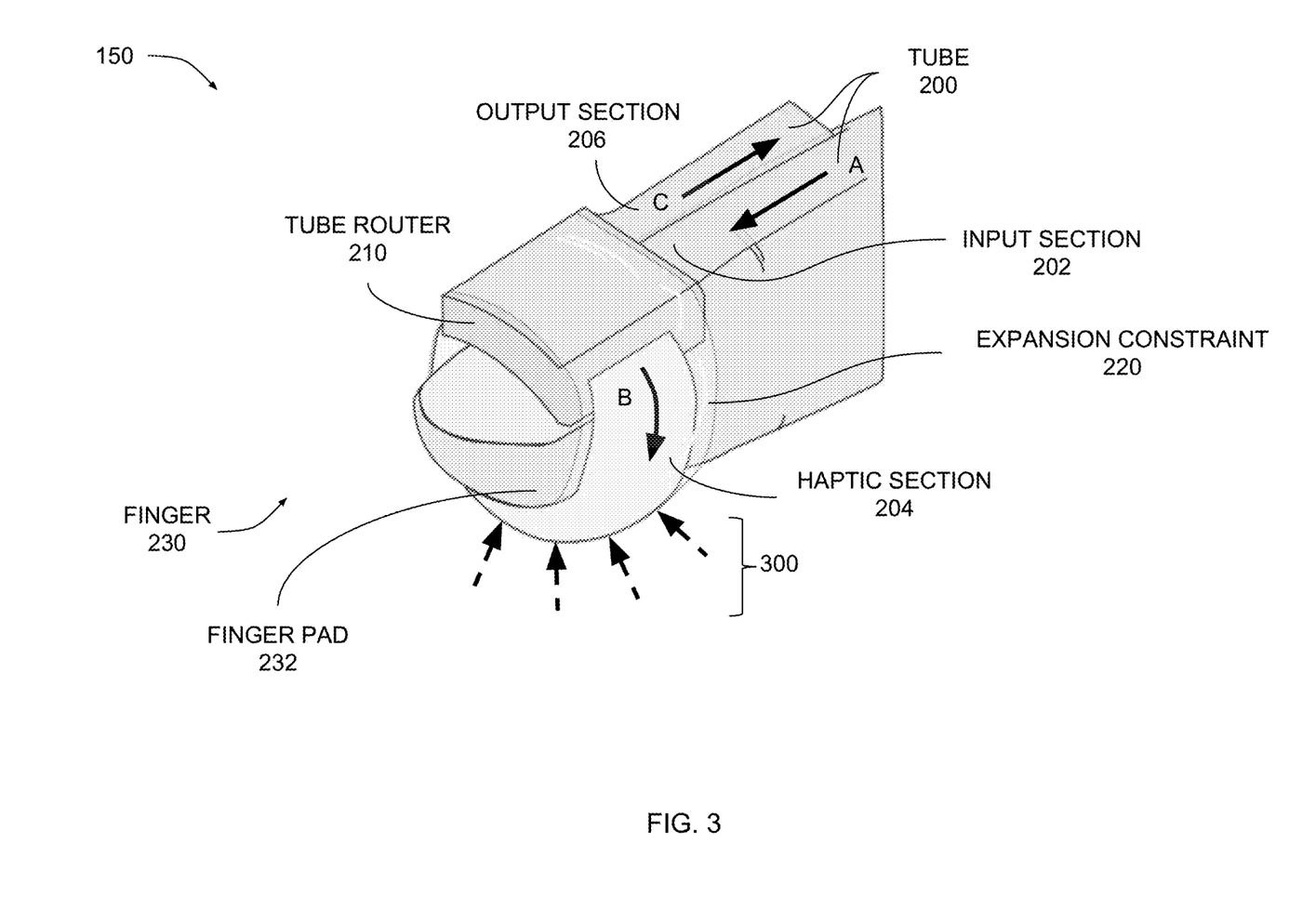
FIG. 3 illustrates how the haptic ring of FIG. 2 generates a tactile sensation, according to various embodiments of the present invention.

FIG. 3 illustrates how the haptic ring of FIG. 2 generates a tactile sensation, according to various embodiments of the present invention. As shown, the fluid enters input section 202 via flux A, traverses haptic section 304 via flux B, and then exits haptic ring 150 via flux C. The pump rates of pumps 120 and 122 generally determine the temperature of the fluid when traversing haptic section 304. When valve 160 is partially or completely closed, haptic section 304 expands against expansion constraint 320 and then outputs pressure 300 to finger pad 332 of the user. When valve 160 is opened and closed repeatedly, haptic section 304 expands against expansion constraint 320 and then contracts, thereby causing pressure 300 to fluctuate and simulate vibration. The magnitude of that vibration depends on the pump rate of pumps 120 and 122, while the frequency of the vibration depends on the frequency at which valve 160 opens and closes.

Referring generally to FIGS. 1-3, in various embodiments, haptic ring 150 may include any or all of the other components of system 100. For example, haptic ring 150 could include pumps 120 and 122, among other components. System 100 may also be embedded within a larger overarching system that shares some or all components of system 100. For example, system 100 could be embedded into a hydraulically-controlled exoskeleton that implements tubes 102 to actuate various servomechanisms. In addition, the techniques described herein can be implemented with other haptic devices apart from rings. For example, a haptic glove could include tubes configured to produce the tactile sensations of temperature, pressure and, vibration in the manner described above. As a general matter, computing device 180 coordinates the overall operation of system 100, as described in greater detail below in conjunction with FIG. 4.

Controlling Physical Stimuli Output by Haptic Ring

Figure 4:
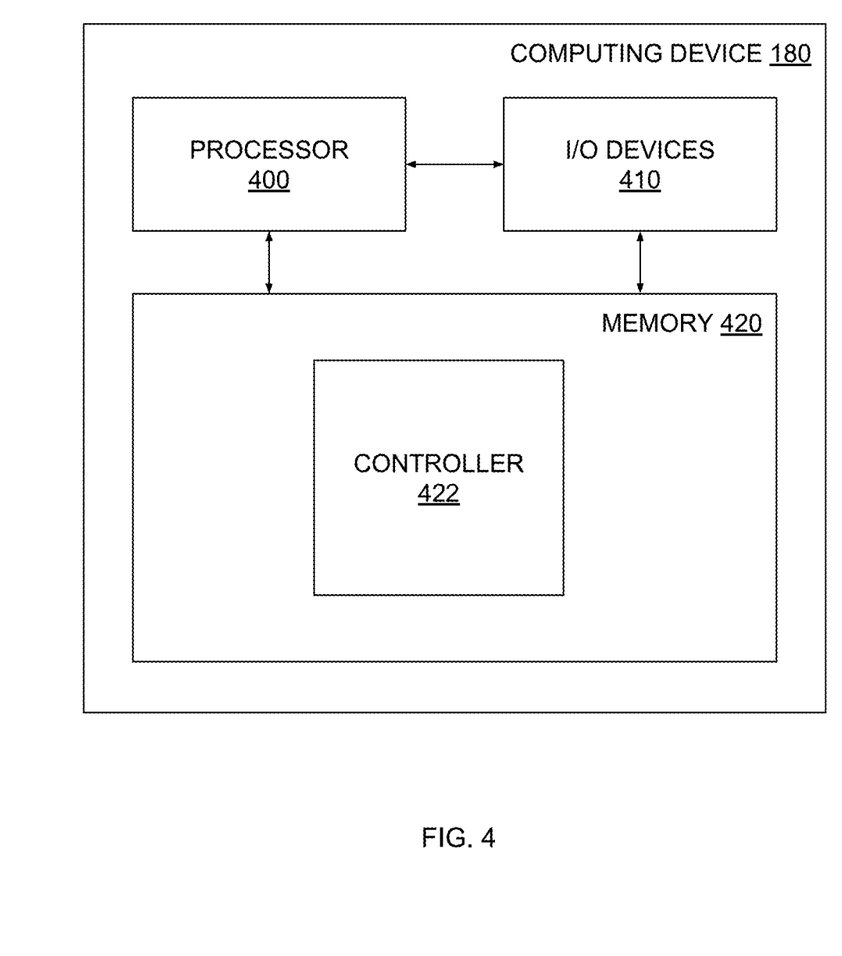
FIG. 4 is a more detailed illustration of the computing device of FIG. 1, according to various embodiments of the present invention.

FIG. 4 is a more detailed illustration of the computing device of FIG. 1, according to various embodiments of the present invention. As shown, computing device 180 includes a processor 400, input/output (I/O) devices 410, and memory 420, coupled together.

Processor 400 includes any technically feasible set of hardware units configured to process data and execute software applications. For example, processor 400 could include one or more central processing units (CPUs). I/O devices 410 include any technically feasible set of devices configured to perform input and/or output operations, including, for example, a display device, a keyboard, and a touchscreen, among others. Memory 420 includes any technically feasible storage media configured to store data and software applications, such as, for example, a hard disk, a random-access memory (RAM) module, and a read-only memory (ROM). Memory 420 includes a controller 422.

Controller 422 is a software application that, when executed by processor 400, causes haptic ring 150 to output various physical stimuli to the user. Controller 424 processes sensor data captured via pressure sensor 140 and temperature sensor 142 and then generates various control signals for controlling pumps 120 and 122 and valve 160. In this manner, controller 424 causes haptic ring 150 to output physical stimuli to the user in the manner previously discussed.

In one embodiment, controller 422 may interoperate with a mixed reality environment that includes both simulated and real-world elements. Controller 422 may cause haptic ring 150 to output physical stimuli to the user that represents those simulated elements. Controller 422 may also cause haptic ring 150 to allow the user to perceive tactile sensations of real-world objects and textures potentially included and/or represented in the mixed reality environment. In doing so, controller 422 may evacuate fluid from haptic ring 150 to cause haptic section 304 to at least partially collapse, thereby facilitating tactile sensations of the user through the collapsed haptic section. This approach can be useful when haptic ring 150 is used in conjunction with mixed reality environments. For example, the mixed reality environment could represent a wiring configuration within a building. A user wearing haptic ring 150 on a finger could trace the finger along a wall of the building and identify active wires when haptic ring 150 outputs heat to the finger pad of the user. Haptic ring 150 could evacuate haptic section 304 and stop outputting heat when the user does not trace the finger close to an active wire, allowing the user to feel the natural texture of the wall.

In another embodiment, controller 422 may maintain a mapping between control settings for pumps 120 and 122 and valve 160 and expected pressure readings associated with those control settings. When the expected pressure for particular control settings differs from the pressure readings provided by pressure sensor 140, controller 422 attributes the pressure difference to the presence of a real-world object or texture. For example, a user wearing haptic ring 150 on a finger could trace the finger across a bumpy surface. Each bump would exert a force against haptic section 204 of haptic ring 150 that would momentarily increase the pressure within tubes 102. Controller 422 would detect these pressure increases via pressure sensor 140 and then identify a divergence from the expected pressure. Controller 422 could then record these pressure changes to generate a model of the bumpy surface. Subsequently, controller 422 could replay the sensation of the bumpy surface by simulating those momentary pressure increases.

Procedure for Outputting Physical Stimuli Via Haptic Ring

Figure 5:
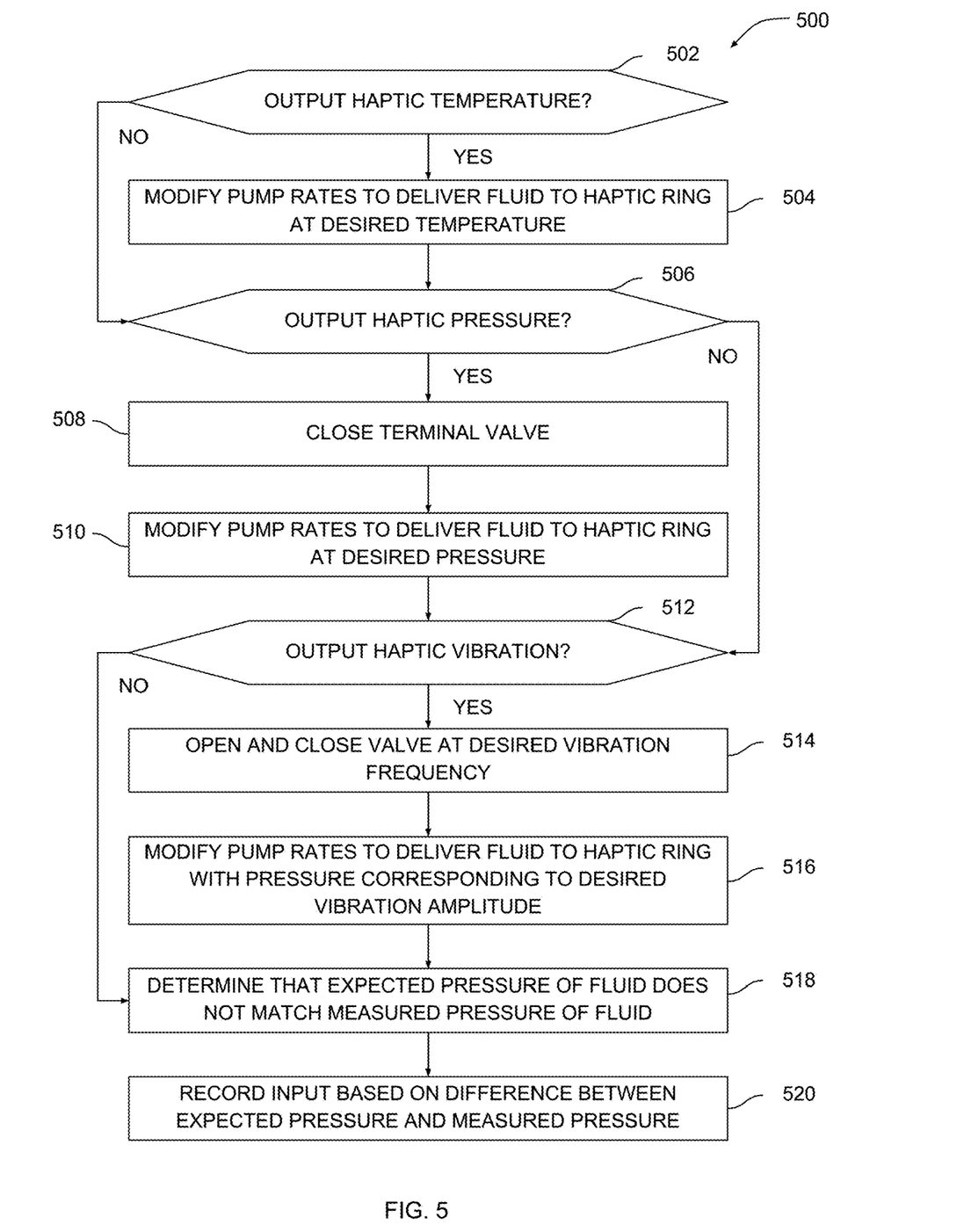
FIG. 5 is a flow diagram of method steps for controlling physical stimuli imparted to a user via a haptic device, according to various embodiments of the present invention.

FIG. 5 is a flow diagram of method steps for controlling physical stimuli imparted to a user via a haptic device, according to various embodiments of the present invention. Although the method steps are described in conjunction with the systems of FIGS. 1-4, persons skilled in the art will understand that any system configured to perform the method steps in any order falls within the scope of the present invention.

As shown, a method 500 begins at step 502, where controller 422 determines whether to output a haptic temperature. For example, controller 422 could interact with a mixed reality environment in which the user holds a simulated object that is meant to feel cold. In response, controller 422 could determine that haptic ring 150 should cause the user to experience the tactile sensation of a cold temperature. If controller 422 determines that a haptic temperature should be output to the user, then the method proceeds to step 504. At step 504, controller 422 modifies the pump rates of pumps 120 and 122 to deliver fluid to haptic ring 150 at a desired temperature. The fluid could be, for example, water. Pumps 120 and 122 cause warm and cold fluid to mix together at a specific rate in order to achieve the desired temperature. Controller 422 may determine the desired temperature based on interactions with the mixed reality environment mentioned above, among other possibilities. If at step 502 controller 422 determines that a haptic temperature should not be output to the user, then the method 500 skips step 504 and proceeds directly to step 506.

At step 506, controller 422 determines whether to output a haptic pressure to the user. For example, in the mixed reality environment discussed above, the user could hold a simulated object that is meant to be heavy. In response, controller 422 could determine that haptic ring 150 should cause the user to experience the tactile sensation of pressure to represent the heaviness of the object. If controller 422 determines that a haptic pressure should be output to the user, then the method proceeds to step 508. At step 508, controller 422 closes terminal valve 160 to allow pressure to accumulate within tubes 102. In response to the accumulation of pressure, haptic section 204 of haptic ring 150 expands and exerts pressure against the finger pad of the user. At step 510, controller modifies the pump rates of pumps 120 and 122 to deliver fluid to haptic ring 150 at a desired pressure. If at step 508 controller 422 determines that a haptic pressure should not be output to the user, then the method 500 skips steps 508 and 510 and proceeds directly to step 512.

At step 512, controller 422 determines whether to output a haptic vibration to the user having a given frequency and amplitude. For example, in the mixed reality environment discussed above, the user could hold a simulated tool that vibrates with a given frequency and given amplitude. In response, controller 422 could determine that haptic ring 150 should cause the user to experience the tactile sensation of vibration to represent the vibration of the tool. If controller 422 determines that a haptic vibration should be output to the user, then the method proceeds to step 514. At step 514, controller 422 opens and closes valve 160 with a specific frequency to allow pressure to accumulate and dissipate within tubes 102. In response to the accumulation and dissipation of pressure, haptic section 204 of haptic ring 150 expands to exert pressure against the finger pad of the user and then contracts to stop exerting pressure. At step 516, controller modifies the pump rates of pumps 120 and 122 to deliver fluid to haptic ring 150 at a desired pressure that corresponds to the amplitude of the vibration. In this manner, haptic ring 150 can cause the user to experience the tactile sensation of a vibration having a given frequency and given amplitude. If at step 512 controller 422 determines that a haptic vibration should not be output to the user, then the method 500 skips steps 514 and 516 and proceeds directly to step 518.

At step 518, controller 422 determines that an expected pressure does not match a measured pressure of the fluid. In one embodiment, controller 422 maintains a mapping between pumps rates and expected pressure readings, and then identifies discrepancies between expected pressure readings and actual pressure readings. Such discrepancies can be caused when the user touches a real-world object that exerts pressure against haptic section 204. At step 520, controller 422 records input based on the difference between the expected pressure and the measured pressure. Based on this difference, controller 422 can generate a model of a real-world object or texture that the user is touching and then subsequently replay tactile sensations to the user to represent that object. This approach can also be applied to model other attributes of a real-world object as well, including temperature or vibration. For example, controller 422 could compare the expected temperature of the fluid to the measured temperature of the fluid and attribute the difference between those temperatures as resulting from heat transfer into or out of a real-world object.

Persons skilled in the art will understand that various steps of the method 500 can be implemented in conjunction with one another to cause haptic ring 150 to output multiple physical stimuli. For example, controller 422 could cause haptic ring 150 to output a given temperature and a given pressure in conjunction with one another by modifying the pump rates of pumps 120 and 122 and partially or fully closing valve 160.

In sum, a haptic system includes a haptic ring that is worn on the finger of a user. The haptic ring includes a flexible tube that is positioned against the finger pad of the user and configured to transport a fluid across the finger pad of the user. A first pump is configured to pump a warm fluid into the flexible tube and a second pump is configured to pump a cold fluid into the flexible tube, thereby providing a haptic sensation of temperature. A valve is positioned downstream of the haptic ring that is configured to open and close to modulate the pressure of the fluid, thereby providing a haptic sensation of pressure and/or vibration to the finger pad of the user. The haptic ring is unobtrusive and therefore does not significantly interfere with the ability of the user to perceive tactile sensations of the real world.

At least one advantage of the disclosed system is that the user can perceive both real-world tactile sensations and simulated tactile sensations while wearing the haptic ring. Accordingly, the haptic ring is especially applicable to mixed reality environments that include both real-world and simulated elements. Because the haptic ring outputs physical stimuli via a thin and flexible tube, the haptic ring is less bulky compared to conventional haptic devices that rely on mechanical actuators to deliver physical stimuli. Thus, the disclosed haptic ring and associated components provide a significant technological advantage compared to conventional haptic systems that cannot effectively be used with mixed reality environments.

1. Some embodiments include a system, comprising a haptic device that is worn on a finger of a user and includes a tube that transports a fluid, and a first pump that is fluidly connected to the haptic device via the tube and pumps a first portion of fluid through the tube, wherein the haptic device outputs a first physical stimulus to the finger of the user in response to the first pump pumping the first portion of fluid through the tube.

2. The system of clause 1, further comprising a second pump that is fluidly connected to the haptic device via the tube and pumps a second portion of fluid through the tube when the first pump pumps the first portion of fluid through the tube.

3. The system of any of clauses 1-2, wherein the first portion of fluid has a first temperature, the second portion of fluid has a second temperature, and the first portion of fluid mixes with the second portion of fluid to produce a third portion of fluid in the tube having a third temperature, wherein the third portion of fluid in the tube generates the first physical stimulus via a transfer of heat caused by the third temperature.

4. The system of any of clauses 1-3, further comprising a valve that is fluidly connected to the haptic device via the tube and is at least partially closed when the haptic device outputs the first physical stimulus.

5. The system of any of clauses 1-4, wherein the first fluid has a first pressure when the valve is at least partially closed, a first portion of the tube expands in response to the first pressure, and the first portion of fluid generates the first physical stimulus via a transfer of force that results when the first portion of the tube expands.

6. The system of any of clauses 1-5, further comprising a valve that is fluidly connected to the haptic device via the tube and opens and closes repeatedly when the haptic device outputs the first physical stimulus.

7. The system of any of clauses 1-6, wherein the first portion of fluid has a pressure level that fluctuates between a first value and a second value when the valve opens and closes repeatedly to cause a first portion of the tube to expand and contract, and the first portion of fluid generates the first physical stimulus via vibrations that result when the first portion of the tube expands and contracts.

8. The system of any of clauses 1-7, further comprising a first sensor that is fluidly connected to the haptic device and determines a first physical characteristic associated with the first portion of fluid.

9. The system of any of clauses 1-8, further comprising a computing device that is electrically coupled to the first pump and adjusts a pump rate of the first pump based on the first physical characteristic.

10. Some embodiments include a haptic device that is worn on the finger of a user, comprising a tube that includes an input section, a haptic section, and an output section, and a tube router coupled to the tube that positions the haptic section of the tube across a portion of the finger of the user, wherein the haptic section of the tube outputs a first physical stimulus to the finger of the user in response to a first portion of fluid being pumped through the tube.

11. The haptic ring of clause 10, further comprising a first pump that is fluidly connected to the tube and that pumps the first portion of fluid through the tube.

12. The haptic ring of any of clauses 10-11, further comprising a second pump that is fluidly connected to the tube and that pumps a second portion of fluid through the tube when the first portion of fluid is being pumped through the tube, wherein the first portion of fluid has a first temperature, the second portion of fluid has a second temperature, and the first portion of fluid mixes with the second portion of fluid to produce a third portion of fluid in the tube having a third temperature, wherein the third portion of fluid in the tube generates the first physical stimulus via a transfer of heat caused by the third temperature.

13. The haptic ring of any of clauses 10-12, further comprising an expansion constraint coupled to the tube router that restricts expansion of the haptic section of the tube, and a valve that is fluidly connected to the tube and that is at least partially closed when the haptic section of the tube outputs the first physical stimulus, wherein the first fluid has a first pressure when the valve is at least partially closed, the haptic section of the tube expands against the expansion constraint in response to the first pressure, and the first portion of fluid generates the first physical stimulus via a transfer of force that results when the haptic section of the tube expands against the expansion constraint.

14. The haptic ring of any of clauses 10-13, further comprising a valve that is fluidly connected to the tube and that opens and closes repeatedly when the haptic section of the tube outputs the first physical stimulus, wherein the first fluid has a pressure level that fluctuates between a first value and a second value when the valve opens and closes repeatedly to cause the haptic section of the tube to expand and contract, and the first portion of fluid generates the first physical stimulus via vibrations that result when the haptic section of the tube expands and contracts.

15. The haptic ring of any of clauses 10-14, further comprising a first sensor that is fluidly connected to the tube and that measures a first physical characteristic associated with the first portion of fluid, wherein the first physical characteristic comprises a temperature or a pressure, and a computing device electrically coupled to the first pump and that adjusts a pump rate of the first pump based on a measurement of the first physical characteristic.

16. The haptic ring of any of clauses 10-15, wherein the computing device determines that the measurement of the first physical characteristic differs from an expected measurement of the first physical characteristic, and in response, compares the measurement of the first physical characteristic to the expected measurement of the first physical characteristic to model a second physical stimuli produced by a first real-world object.

17. The haptic ring of any of clauses 10-16, wherein the first pump evacuates the first portion of fluid from the tube to cause the haptic section of the tube to at least partially collapse, wherein the haptic section of the tube, when at least partially collapsed, increases the transfer of force from a first real-world object to the finger of the user compared to when the haptic section of the tube is not at least partially collapsed.

18. Some embodiments include a computer-implemented method for outputting physical stimuli to a user, the method comprising determining a first pump rate for a first pump based on a first sensor reading, wherein the first pump is fluidly connected to a haptic device that is worn on the finger of the user and includes a tube that transports a fluid, and transmitting the first pump rate to the first pump to cause the first pump to pump a first portion of fluid through the tube, wherein the haptic device outputs a first physical stimulus to the finger of the user in response to the first pump pumping the first portion of fluid through the tube.

19. The computer-implemented method of clause 18, wherein the first sensor reading comprises a temperature reading, and further comprising determining a second pump rate for a second pump based on the first sensor reading, wherein the second pump is fluidly connected to the haptic device, transmitting the second pump rate to the second pump to cause the second pump to pump a second portion of fluid through the tube, wherein the first portion of fluid has a first temperature, the second portion of fluid has a second temperature, and the first portion of fluid mixes with the second portion of fluid to produce a third portion of fluid in the tube having a third temperature, wherein the third portion of fluid in the tube generates the first physical stimulus via a transfer of heat caused by the third temperature.

20. The computer-implemented method of any of clauses 18-19, wherein the first sensor reading comprises a pressure reading, and further comprising causing a valve that is fluidly connected to the haptic device via the tube to at least partially close when the haptic device outputs the first physical stimulus, wherein the first portion of fluid has a first pressure when the valve is at least partially closed, a first portion of the tube expands in response to the first pressure, and the first portion of fluid generates the first physical stimulus via a transfer of force that results when the first portion of the tube expands.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system, comprising:
   a haptic device that is worn on a finger of a user and includes a tube router and a tube that transports a fluid, wherein the tube router is coupled to the tube and positions a haptic section of the tube across a portion of the finger of the user, wherein the tube router and the haptic section form a ring around the finger of the user; and
   a first pump that is fluidly connected to the haptic device via the tube and pumps a first portion of fluid through the tube, wherein the haptic device outputs a first physical stimulus to the finger of the user in response to the first pump pumping the first portion of fluid through the tube.

2. The system of claim 1, further comprising a second pump that is fluidly connected to the haptic device via the tube and pumps a second portion of fluid through the tube when the first pump pumps the first portion of fluid through the tube.

3. The system of claim 2, wherein the first portion of fluid has a first temperature, the second portion of fluid has a second temperature, and the first portion of fluid mixes with the second portion of fluid to produce a third portion of fluid in the tube having a third temperature, wherein the third portion of fluid in the tube generates the first physical stimulus via a transfer of heat caused by the third temperature.

4. The system of claim 1, further comprising a valve that is fluidly connected to the haptic device via the tube and is at least partially closed when the haptic device outputs the first physical stimulus.

5. The system of claim 4, wherein the first fluid has a first pressure when the valve is at least partially closed, a first portion of the tube expands in response to the first pressure, and the first portion of fluid generates the first physical stimulus via a transfer of force that results when the first portion of the tube expands.

6. The system of claim 1, further comprising a valve that is fluidly connected to the haptic device via the tube and opens and closes repeatedly when the haptic device outputs the first physical stimulus.

7. The system of claim 6, wherein the first portion of fluid has a pressure level that fluctuates between a first value and a second value when the valve opens and closes repeatedly to cause a first portion of the tube to expand and contract, and the first portion of fluid generates the first physical stimulus via vibrations that result when the first portion of the tube expands and contracts.

8. The system of claim 1, further comprising a first sensor that is fluidly connected to the haptic device and determines a first physical characteristic associated with the first portion of fluid.

9. The system of claim 8, further comprising a computing device that is electrically coupled to the first pump and adjusts a pump rate of the first pump based on the first physical characteristic.

10. A haptic device that is worn on the finger of a user, comprising:
a tube that includes an input section, a haptic section, and an output section; and
a tube router coupled to the tube that positions the haptic section of the tube across a portion of the finger of the user, wherein the tube router and the haptic section form a ring around the finger of the user, wherein the haptic section of the tube outputs a first physical stimulus to the finger of the user in response to a first portion of fluid being pumped through the tube.

11. The haptic device of claim 10, further comprising a first pump that is fluidly connected to the tube and that pumps the first portion of fluid through the tube.

12. The haptic device of claim 11, further comprising a second pump that is fluidly connected to the tube and that pumps a second portion of fluid through the tube when the first portion of fluid is being pumped through the tube, wherein the first portion of fluid has a first temperature, the second portion of fluid has a second temperature, and the first portion of fluid mixes with the second portion of fluid to produce a third portion of fluid in the tube having a third temperature, wherein the third portion of fluid in the tube generates the first physical stimulus via a transfer of heat caused by the third temperature.

13. The haptic device of claim 11, further comprising:
an expansion constraint coupled to the tube router that restricts expansion of the haptic section of the tube; and
a valve that is fluidly connected to the tube and that is at least partially closed when the haptic section of the tube outputs the first physical stimulus, wherein the first fluid has a first pressure when the valve is at least partially closed, the haptic section of the tube expands against the expansion constraint in response to the first pressure, and the first portion of fluid generates the first physical stimulus via a transfer of force that results when the haptic section of the tube expands against the expansion constraint.

14. The haptic device of claim 11, further comprising a valve that is fluidly connected to the tube and that opens and closes repeatedly when the haptic section of the tube outputs the first physical stimulus, wherein the first fluid has a pressure level that fluctuates between a first value and a second value when the valve opens and closes repeatedly to cause the haptic section of the tube to expand and contract, and the first portion of fluid generates the first physical stimulus via vibrations that result when the haptic section of the tube expands and contracts.

15. The haptic device of claim 11, further comprising:
a first sensor that is fluidly connected to the tube and that measures a first physical characteristic associated with the first portion of fluid, wherein the first physical characteristic comprises a temperature or a pressure; and
a computing device electrically coupled to the first pump and that adjusts a pump rate of the first pump based on a measurement of the first physical characteristic.

16. The haptic device of claim 15, wherein the computing device:
determines that the measurement of the first physical characteristic differs from an expected measurement of the first physical characteristic; and
in response, compares the measurement of the first physical characteristic to the expected measurement of the first physical characteristic to model a second physical stimuli produced by a first real-world object.

17. The haptic device of claim 11, wherein the first pump evacuates the first portion of fluid from the tube to cause the haptic section of the tube to at least partially collapse, wherein the haptic section of the tube, when at least partially collapsed, increases the transfer of force from a first real-world object to the finger of the user compared to when the haptic section of the tube is not at least partially collapsed.

18. A computer-implemented method for outputting physical stimuli to a user, the method comprising:
determining a first pump rate for a first pump based on a first sensor reading, wherein the first pump is fluidly connected to a haptic device that is worn on the finger of the user and includes a tube router and a tube that transports a fluid, wherein the tube router is coupled to the tube and positions a haptic section of the tube across a portion of the finger of the user, wherein the tube router and the haptic section form a ring around the finger of the user; and
transmitting the first pump rate to the first pump to cause the first pump to pump a first portion of fluid through the tube, wherein the haptic device outputs a first physical stimulus to the finger of the user in response to the first pump pumping the first portion of fluid through the tube.

19. The computer-implemented method of claim 18, wherein the first sensor reading comprises a temperature reading, and further comprising:
determining a second pump rate for a second pump based on the first sensor reading, wherein the second pump is fluidly connected to the haptic device;
transmitting the second pump rate to the second pump to cause the second pump to pump a second portion of fluid through the tube, wherein the first portion of fluid has a first temperature, the second portion of fluid has a second temperature, and the first portion of fluid mixes with the second portion of fluid to produce a third portion of fluid in the tube having a third temperature, wherein the third portion of fluid in the tube generates the first physical stimulus via a transfer of heat caused by the third temperature.

20. The computer-implemented method of claim 18, wherein the first sensor reading comprises a pressure reading, and further comprising causing a valve that is fluidly connected to the haptic device via the tube to at least partially close when the haptic device outputs the first physical stimulus, wherein the first portion of fluid has a first pressure when the valve is at least partially closed, a first portion of the tube expands in response to the first pressure, and the first portion of fluid generates the first physical stimulus via a transfer of force that results when the first portion of the tube expands.

* * * * *